(12) United States Patent
Guler et al.

(10) Patent No.: US 9,343,088 B2
(45) Date of Patent: May 17, 2016

(54) NEAR FIELD TRANSDUCER FOR HEAT-ASSISTED MAGNETIC RECORDING

(71) Applicant: PRF, West Lafayette, IN (US)

(72) Inventors: Urcan Guler, Lafayette, IN (US); Alexander Kildishev, West Lafayette, IN (US); Vladimir M. Shalaev, West Lafayette, IN (US); Alexandra Boltasseva, West Lafayette, IN (US); Donald Stocks, Lafayette, IN (US); Gururaj Naik, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 14/401,917

(22) PCT Filed: May 19, 2014

(86) PCT No.: PCT/US2014/038561
§ 371 (c)(1),
(2) Date: Nov. 18, 2014

(87) PCT Pub. No.: WO2014/197190
PCT Pub. Date: Dec. 11, 2014

(65) Prior Publication Data
US 2015/0287425 A1 Oct. 8, 2015

Related U.S. Application Data

(60) Provisional application No. 61/832,689, filed on Jun. 7, 2013, provisional application No. 61/939,563, filed on Feb. 13, 2014.

(51) Int. Cl.
*G11B 5/00* (2006.01)
*G11B 5/31* (2006.01)
(Continued)

(52) U.S. Cl.
CPC ....... *G11B 5/314* (2013.01); *G11B 5/00* (2013.01); *G11B 5/3116* (2013.01);
(Continued)

(58) Field of Classification Search
None
See application file for complete search history.

(56) References Cited

U.S. PATENT DOCUMENTS 8,619,512 B1* 12/2013 Yuan ............... G11B 5/3136
369/13.33
2010/0290323 A1 11/2010 Isogai et al.
(Continued)

FOREIGN PATENT DOCUMENTS

WO 2010098794 9/2010

*Primary Examiner* — Brian Butcher
(74) *Attorney, Agent, or Firm* — Nadya Reingand

(57) ABSTRACT

An apparatus and method for heat-assisted magnetic recording (HAMR) employing a near-field transducer (NFT) made of plasmonic ceramic materials or intermetallics are disclosed. The NFT is made of a plasmonic material as well as a protective outer layer, which provides for longer usefulness and improved performance of the NFT and recording device. The plasmonic materials used include but are not limited to $TiN_x$, $ZrN_x$, $HfN_x$, $TaN_x$, $VN_x$, $TiSi_{2-x}$, $TiAl_xN_y$, $TiZr_xN_y$, $ZnO$, $SnO_2$, $In_2O_3$, $RuO_2$, $Lu_2O_3$, $WO_2$, and $MgB_2$. Such materials, in combination with a protective layer, provide higher resistances and greater performance at temperatures required for HAMR, ranging from 300 up to 500 degrees Celsius.

16 Claims, 5 Drawing Sheets

(51) Int. Cl.
*G11B 5/60* (2006.01)
*G11B 5/48* (2006.01)
*B82Y 10/00* (2011.01)

(52) U.S. Cl.
CPC .............. *G11B 5/6088* (2013.01); *B82Y 10/00* (2013.01); *G11B 5/4866* (2013.01); *G11B 2005/0021* (2013.01); *Y10S 977/831* (2013.01); *Y10S 977/943* (2013.01)

(56) References Cited

U.S. PATENT DOCUMENTS

| | | |
|---|---|---|
| 2011/0205863 A1 | 8/2011 | Zhao et al. |
| 2011/0280515 A1 | 11/2011 | Black et al. |
| 2012/0236694 A1 | 9/2012 | Hellwig et al. |
| 2014/0233361 A1* | 8/2014 | Shimazawa ................ 369/13.32 |
| 2014/0376341 A1* | 12/2014 | Wessel ................ G11B 5/3163 369/13.33 |

* cited by examiner

NEAR FIELD TRANSDUCER FOR HEAT-ASSISTED MAGNETIC RECORDING

CROSS REFERENCE TO RELATED APPLICATIONS

This patent application is a National stage application for PCT application PCT/US14/38561, which claims priority to, and incorporates fully by reference, U.S. Provisional Patent Application No. 61/832,689, filed Jun. 7, 2013, and U.S. Provisional Patent Application No. 61/939,563, filed Feb. 13, 2014.

FIELD OF THE INVENTION

The invention relates to the field of plasmonics, and particularly to plasmonics for HAMR (heat-assisted magnetic recording), in biological and chemical sensing, medicine, optical communication, imaging, light harvesting, energy conversion, data storage, nanofabrication, and other applications.

BACKGROUND OF THE INVENTION

Plasmonics relies upon the coupling of light into free electron plasma in metals to create a wave of surface charge oscillation called plasmon. Plasmon is typically associated with a highly concentrated electromagnetic field, which is a key feature in many of its applications.

Plasmon can exist only at the surface of a metal or at the surface of any other material with negative dielectric permittivity (epsilon<0, within the operation spectral range), and it is often referred to as surface plasmon. Thus, the metal (or other material with epsilon<0, within the operation spectral range) is an essential component of any plasmonic device, and the optical properties of the metal used in a given plasmonic device will dictate the performance of the device. Metals have been characterized by large optical losses, limiting the performance of modern plasmonic devices.

Conventionally, gold and silver have been the metals of choice for plasmonic devices, due to having the lowest optical losses among metals. However, gold and silver are still not the best materials to fabricate and integrate into plasmonic devices because of several problems associated with their properties. First, their optical losses are small but not insignificant. In the visible range, the losses are relatively high for gold due to interband absorption. Additionally, gold and silver do not have optical properties that can be tailored, adjusted, or tuned to suit a particular application. Second, gold and silver are difficult to fabricate into ultra-thin films or nanostructures, which are often necessary in plasmonic devices. Moreover, patterning on the nanoscale level leads to additional optical loss in such metals. Third, silver and gold are not thermally stable at high temperatures, especially when nanostructured. Fourth, silver is not chemically stable and causes problems in many applications (e.g., in sensing). Fifth, neither metal is CMOS compatible, hence posing challenges in the integration of plasmonic devices with nanoelectronic CMOS devices.

The problems associated with gold and silver severely limit the development of plasmonics as a science into a technology. Hence, alternative plasmonic materials are essential to the further development of this technology.

U.S. Pat. No. 8,427,925, to Zhao et al. (hereafter "Zhao") is one example of technology which employs the use of alternative plasmonic materials. The functionality of a given plasmonic material depends on nanoscale features such as the size of nanoparticles, the distance between them, etc. While Zhao discusses improvement of mechanical stability by adding elements such as TiN to gold, the present invention goes further by providing not only for mechanical stability, but also for the fact that the nanoelements keep their shape and optically perform stable over a longer period, a feature which goes beyond simple mechanical stability.

SUMMARY OF THE INVENTION

Figure 1:
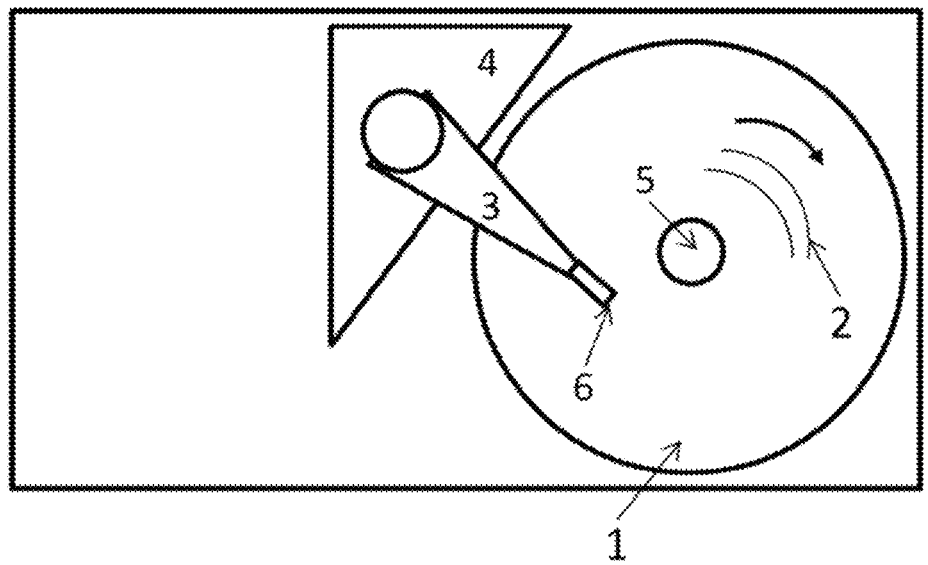
FIG. 1. Schematic of Hard-Disk-Drive (HDD) showing only the parts of interest.

The present invention discloses an apparatus for heat-assisted magnetic recording (HAMR), the apparatus comprising a light source and a near-field transducer (NFT) made of plasmonic ceramic material(s) and additionally protected by an outer layer no thicker than 25 nanometers. Such an outer layer further protects the NFT from oxidation, stress, and heat, thus extending its productivity and useful lifetime. The plasmonic materials disclosed herein include nitrides, borides, oxides, and carbides of metals such as titanium, zinc, aluminum, and vanadium. In certain embodiments of the present invention, the ceramic plasmonic material is a refractory plasmonic material, which acts as a field enhancer and heat source. In all embodiments, the ceramic material withstands temperatures above 100 degrees Celsius. In preferred embodiments, the ceramic material is also annealed to the apparatus at temperatures above 100 degrees Celsius. In some embodiments, the capping layer consists of several layers. In other embodiments, a waveguide is placed between the apparatus' light source and the ceramic material (sometimes a tapered dielectric waveguide). This waveguide may additionally comprise a protective layer similar to that of the NFT. To further protect the NFT, some embodiments enclose the ceramic material in an inert gas environment. A method of using the disclosed apparatus for HAMR is also claimed. The operating mechanisms of the disclosed apparatus and method are based on radiative heat focusing, nanoscale conductive heating, light confinement, and combinations thereof.

DETAILED DESCRIPTION OF THE PREFERRED EMBODIMENT

Definitions

"Ceramic material," or "ceramic plasmonic material," as used herein, is defined as a compound of a metal and/or a non metal including, but not limited to, nitrides, carbides, borides, silicides, and oxides of metals. Especially the interstitial and covalent materials are known to be refractory, which satisfies the operating conditions required for heat assisted magnetic recording. As discussed herein, plasmonic material(s) may be comprised of any element such as Au, Ag, Cu, or Al, or alternatively, ceramic material, i.e., non-stoichiometric binary compounds including, but not limited to, $TiN_x$, $ZrN_x$, $HfN_x$, $TaN_x$, $VN_x$, $TiSi_{2-x}$, or ternary compounds such as $TiAl_xN_y$, and $TiZr_xN_y$, where x and y range from 0 to 1.

"Radiative heat focusing," as used herein, is defined as spatial concentration of the electromagnetic radiation of thermal origin at infrared frequencies.

"Nanoscale conductive heating," as used herein, is defined as conduction of heat by electrons and phonons.

"Light confinement," as used herein, is defined as spatial concentration of the propagating or evanescent electromagnetic waves produced by a laser at optical frequencies.

The present invention goes beyond the prior art by providing not only for mechanical stability, but also for the fact that the nanoelements comprising an NFT keep their shape and optical properties similar. This feature goes beyond simple mechanical stability of the prior art, because elevated operational temperatures cause degradation of properties from oxidation; this is true for modern materials with even the highest melting points. Despite its high melting point and corrosion resistance, TiN suffers from oxidation at temperatures around 350° C. (See, e.g., N. C. Saha and H. G. Tompkins, "Titanium nitride oxidation chemistry: An xray photoelectron spectroscopy study," Journal of Applied Physics 72, 3072-3079 (1992); and H. G. Tompkins, "The initial stages of the oxidation of titanium nitride," Journal of Applied Physics 71, 980-983 (1992)).

The expected operation temperature for HAMR devices lies in the range between 300-500° C., a temperature at which plasmonic properties of a transition metal nitride inevitably degrade in time due to oxidation. The prior art mentions that TiN and ZrN can be used as near-field transducer (NFT) plasmonic antennas because they are mechanically strong and have high melting points. The prior art does not mention, however, the problem of the process of oxidation of such materials that becomes very active as temperature increases. For a nanoantenna with dimensions on the order of 100 nm (or less), oxidation will have severe effects on performance, eventually leading to failure of a device. The present invention modifies the prior art design by including an additional protective layer ("capping layer") or multiple additional layers comprising one or more capping layers. The present invention enables the use of TiN (or any other metal- or intermetallic plasmonic ceramic) material antennas for HAMR NFTs, and it increases the useful lifetime and performance of such devices.

Prior art approaches rely on the field enhancement of a magnetic layer, eventually resulting in temperature increase. The present invention teaches that with TiN and similar material, absorption by the particle itself is comparable to field enhancement. Thus, a heated antenna is used as a heat source in addition to field enhancement, and heating of the antenna shifts from a problem to a desired mechanism. As such a result changes the operating physics, smaller particles become compatible simply because absorption dominates over field enhancement for small particles. Note that with a field enhancement-dominant method, smaller particles will have reduced field enhancement and higher heating, which is not preferred. Using smaller particles for NFTs also enables denser information recording.

One alternative plasmonic material with optical properties similar to those of gold is titanium nitride (TiN). Titanium nitride is one of the hardest materials with a very high melting point (>2700° C.). TiN is CMOS compatible, bio-compatible and can be grown as high quality epitaxial ultra-thin films or as nanostructured films. These advantages of TiN make it a better plasmonic material. TiN has been demonstrated to support surface plasmon-polaritons (SPPs). And TiN nanostructures exhibit localized surface plasmon resonance (LSPR).

In addition to TiN, the plasmonic material may be comprised of several other non-stoichiometric binary compounds including, but not limited to, $ZrN_x$, $HfN_x$, $TaN_x$, $VN_x$, $TiSi_{2-x}$, or ternary compounds such as $TiAl_xN_y$, and $TiZr_xN_y$. The non-stoichiometric compounds utilized by this invention make up the class of ceramics, further defined as metal and intermetallic nitrides, including nitrides with all combinations of metals (e.g. TiN, ZrN, TaN, TiZrN, etc.). Thus, throughout this application, any of the compounds listed here, as well as other compounds within this class, and in any combination, can be substituted for TiN to perform in a similar manner The strength of the localized surface plasmon resonance ("LSPR") in TiN nanoparticles is predicted to be similar to that of gold nanoparticles, but occurring in a broad wavelength range around 750 nm. This range corresponds to the biological transparency window where biological and medical applications operate. This is also the spectrum of operation of many commercially available semiconductor laser or LED sources. There are many medical and other applications involving phenomena with light in this spectral range. LSPR is one such phenomenon and the focus of this invention. Often, applications involving plasmons utilize LSPR in metal nanoparticles. LSPR enhances the electromagnetic field around the nanoparticle several times, and it also causes the metal particle to absorb much more radiation than it would without LSPR. Such excessive absorption of optical radiation causes the nanoparticle to locally heat its surroundings (i.e. "surface plasmon-enabled local heating"). TiN nanoparticles are a better substitute to gold nanoparticles given their biocompatibility, thermal stability, and relatively higher heating performance. Both experimental and numerical experiments have been performed, and the results show that TiN performs better than gold in the biological window for heating applications.

Local heating through LSPR may be used to greatly increase the areal density of data storage devices. Magnetic recording hard disks are projected to be using heat-assisted-magnetic recording (HAMR) technology in the future. Magnetic writing requires selective magnetization of nanoparticles located on a hard disk. Magnetization speed, however, is a limiting factor with regard to the operational speed of modern hard disks. Also, the size of the magnetization domains limits the storage size and ability of hard disks. One way to overcome these limitations is to use a recording medium with a higher coercivity (i.e. a higher resistance to changes in magnetization) and locally heat the magnetization domains. Local heating using ceramic materials increases the storage size by shrinking the size of a bit-storage domain. Local heating using ceramic materials also increases the operational speed (relative to HAMR devices using gold or copper, at least) by increasing the speed of magnetization. Thermal performance characteristics of the materials used in HAMR devices are important because HAMR requires heating the storage medium prior to a write operation. Thus, local heating is a key component in HAMR technology, and surface plasmon-enabled local heating is an ideal candidate for such application. LSPR in metal nanoparticles is useful for such applications. Nanoparticles of a metal that is thermally stable, mechanically tough, and CMOS compatible is needed for such application. Also, the LSPR occurring close to the wavelengths of available injection diode lasers is useful in the integration of the HAMR device. TiN is one material that is thermally stable, mechanically tough, and CMOS compatible (other materials are also disclosed herein). TiN-based implementation of plasmonic HAMR devices advances current HAMR technology.

The details of the implementation of plasmonics-based HAMR technology are shown in FIGS. 1 through 6. FIG. 1 shows the important components of a Hard Disk Drive (HDD) from an overhead perspective; specifically, the magnetic recording disk 1, the track onto which data is stored 2, the actuator arm 3, the voice coil motor assembly 4, the spindle 5, and the head/gimbal assembly 6.

Figure 2:
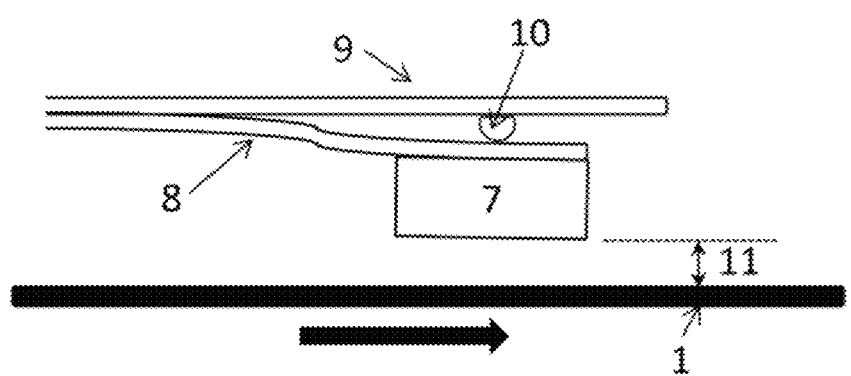
FIG. 2. The schematic of head/gimbal assembly that hosts the slider.

FIG. 2 shows further important components of the head/gimbal assembly, from a lateral (i.e. side) perspective. A slider 7 rests against the gimbal 8. The slider/gimbal assembly is suspended from a bar 9 and positioned with the help of a dimple 10. The bottom surface of the slider 7 is the air bearing surface (ABS), with a flying height 11 of the slider 7 above the magnetic recording disk surface 1.

Figure 3:
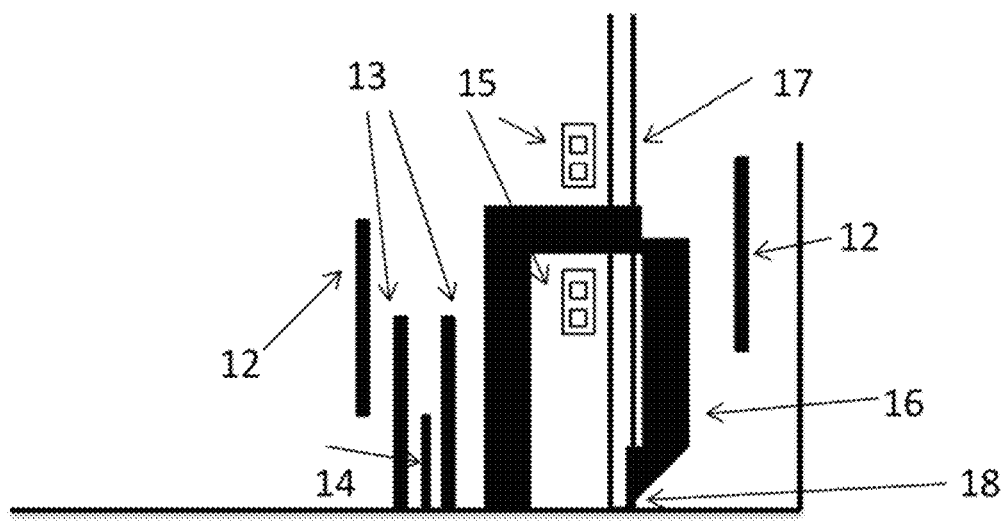
FIG. 3. The important components of the read/write head of the HDD using HAMR.

FIG. 3 shows further details of the head unit located inside the slider, from a closer lateral perspective. The head consists of heaters 12 for a height correction system, rear shields 13, the read head 14, the write coils 15 around the return pole, and the write pole 16. The path of light 17 used to heat the magnetic nanoparticles may be a waveguide or may be based on free-space optics. The guided light may be from a laser source with sufficient power. The near-field transducer (NFT, or nanoantenna) 18 causes local heating from the light illumination.

Figure 4:
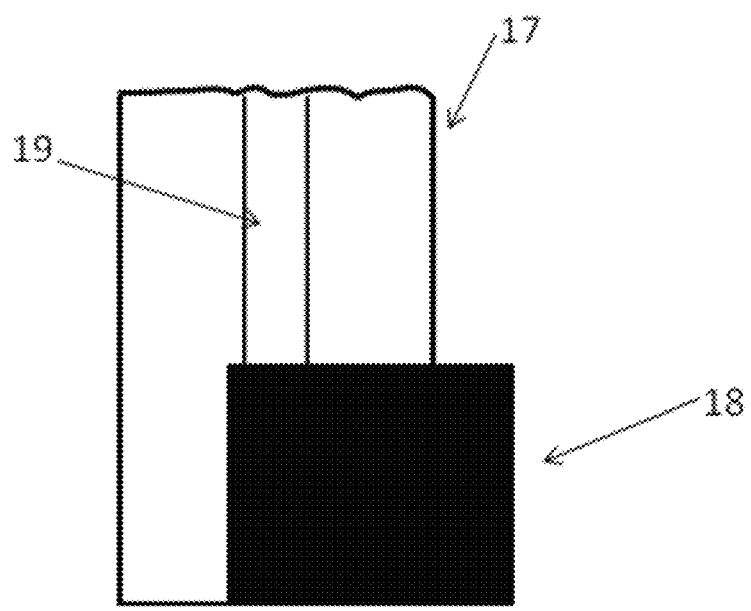
FIG. 4. Schematic of the interface of waveguide with the near-field transducer.
Figure 5:
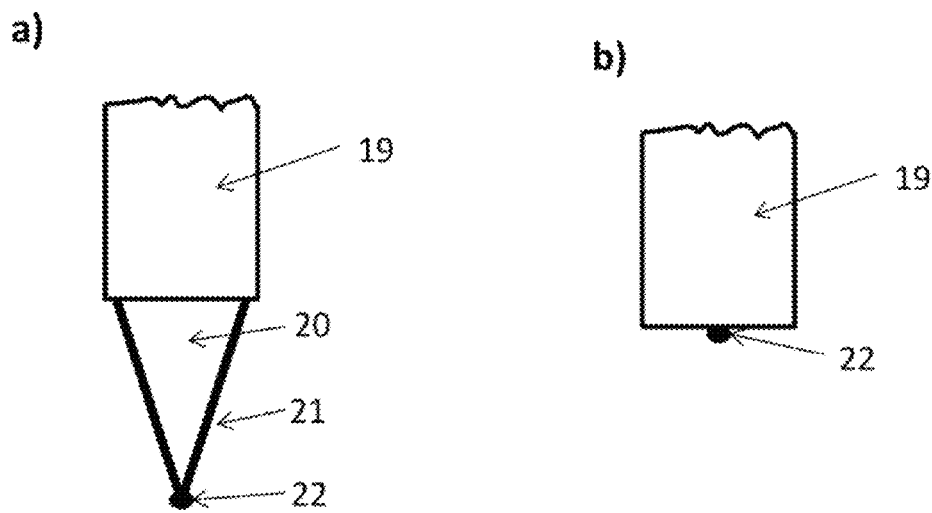
FIG. 5. Two possible designs, (a) and (b), of the tip of NFT.

FIG. 4 shows a schematic of the NFT 18, the core of the waveguide (or the light beam guide based on free-space optics) 19, and the path of light used to heat the magnetic nanoparticles 17. The light travels through the waveguide and ends up in the NFT 18, thus causing local heating. The NFT 18 then interfaces with the ABS (air bearing surface).

Figure 8:
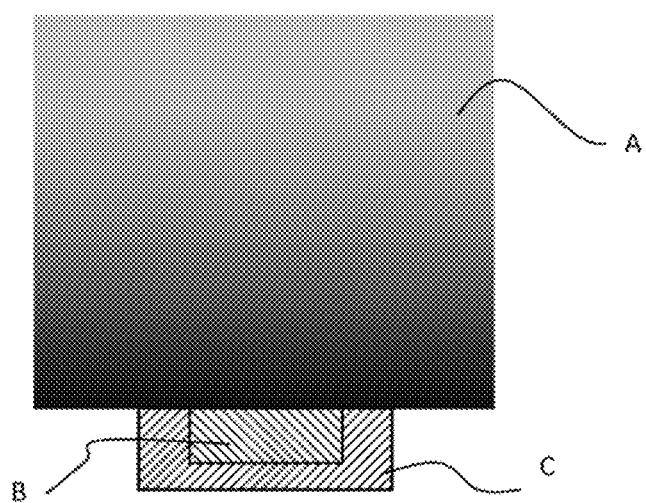
FIG. 8. A plasmonic ceramic near field transducer capped with a protective layer against oxidation. This structure is attached to the end of a waveguide for enhanced optical coupling.

The tip of the NFT that interfaces with the ABS can be formed using a tapered waveguide section as shown in FIG. 5a. The tapered tip 20 (e.g. Near-Field-Optical Microscopy tip) is a dielectric tip, usually with a metallic coating 21. The conical section ends with a plasmonic material end-piece 22. An alternative arrangement of the NFT is also possible, as shown in FIG. 5b. There, the core of the waveguide does not have a tapered tip, and instead ends just with the plasmonic material end-piece 22. This plasmonic material 22 and the metallic coating 21 can be further covered with an oxidation-protection layer as shown in FIG. 8.

The waveguide coupling the illuminating light to the NFT may be a plasmonic material, and it usually comprises one or several ceramic plasmonic materials as described herein. This tapered plasmonic ceramic waveguide itself may act as the focusing tip where the end of the waveguide is employed as an NFT. In this scenario, the present disclosures on the plasmonic ceramic NFT, including the addition of an oxidation-protection layer(s) ("capping layer"), may equally be applied to the tapered plasmonic ceramic waveguide.

Figure 6:
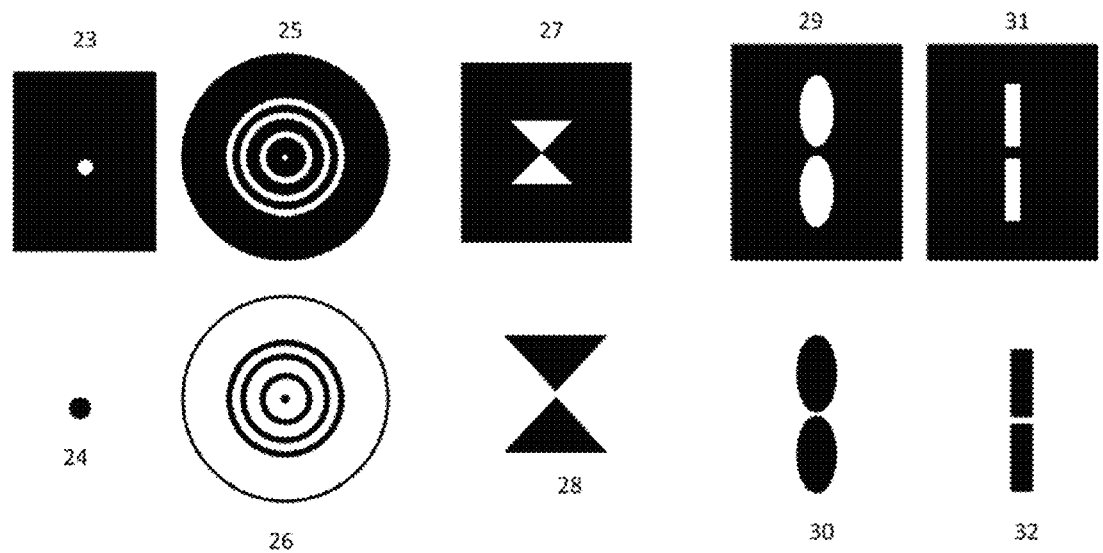
FIG. 6. Plasmonic apertures or nanoparticles or nanostructures for near-field light concentration and local heating.

There are many possibilities for the structure and design of the plasmonic material at the end of the NFT. FIG. 6 displays several examples of designs of plasmonic apertures or nanoparticles/nanostructures of a plasmonic material that may serve as an NFT tip. There are various trade-offs involved in each structure. The odd-numbered designs 23, 25, 27, 29, 31 correspond to plasmonic apertures where a hole/dielectric inclusion is created on a metallic sheet. The even-numbered designs 24, 26, 28, 30, 32 correspond to the duals, or Babinet, complements of the odd-numbered designs, where a plasmonic material nanostructure is created on a dielectric background.

Figure 7A:
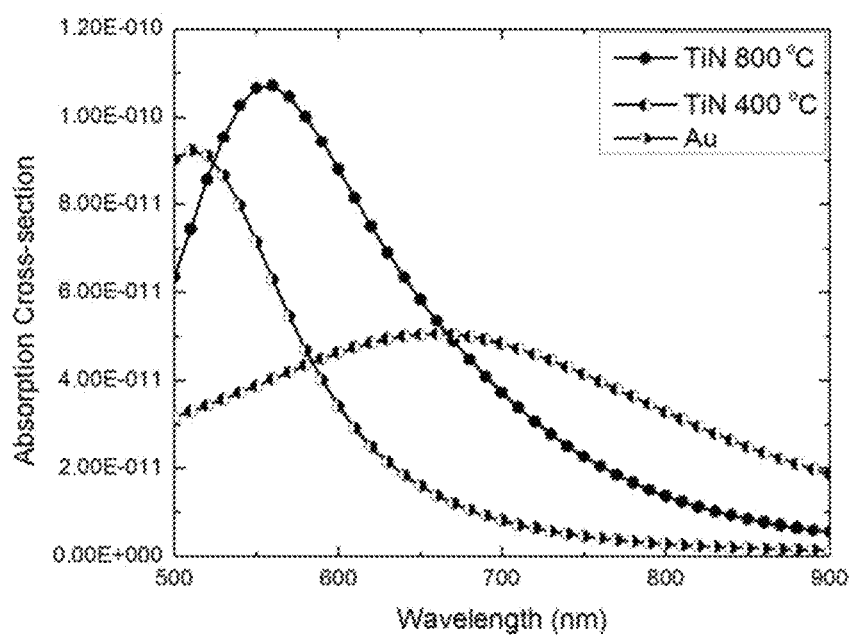
FIG. 7(a). Absorption cross-section of spherical plasmonic nanoparticles with 15 nm radius.

FIG. 7(a) shows the absorption cross-section of spherical plasmonic nanoparticles with a 15 nm radius. Dielectric permittivities retrieved from thin films of Au and TiN, grown at 400° C. and 800° C., are used in the calculation for accurate results. The results show that TiN provides better absorption efficiencies when compared to Au. Due to the non-stoichiometric nature of TiN, it is also possible to obtain particles with different resonance strengths and spectral positions.

Figure 7B:
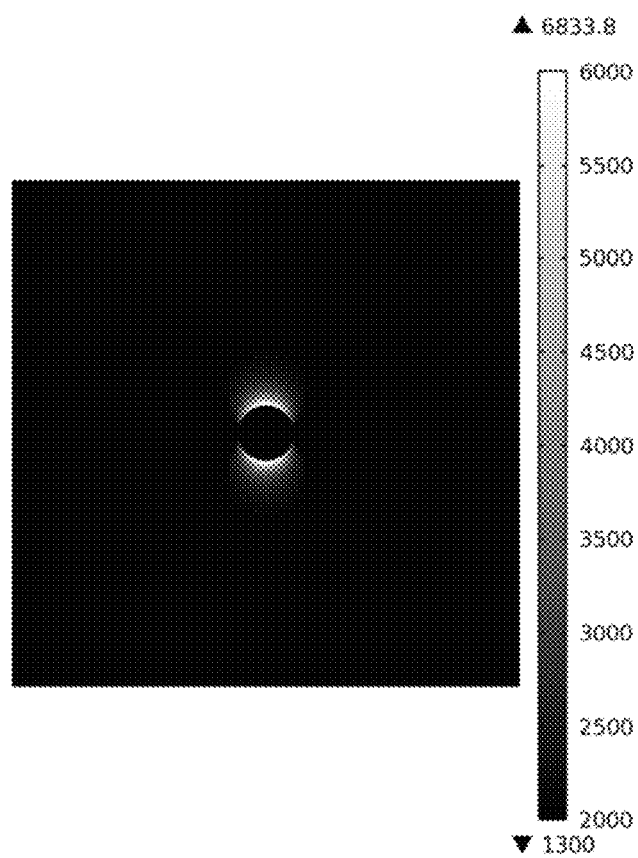
FIG. 7(b). Dipolar field distribution for one type of TiN spherical nanoparticle.

FIG. 7(b) shows the dipolar field distribution for a TiN spherical nanoparticle (grown at 800° C.) at a 560 nm wavelength, which is the peak position for the corresponding material.

FIG. 8 shows a structure which is attached to the end of a waveguide A for enhanced optical coupling. Here, a plasmonic ceramic near field transducer B is capped with a protective layer against oxidation (i.e. capping layer) C. The ceramic plasmonic materials claimed in this design are known to be durable at high temperatures. For example, TiN is considered a refractory material, as are many other nitrides and carbides of transition metals. Although these materials may be used as protective coatings for many other applications, they are still also susceptible to oxidation when exposed to air or other forms of oxygen-containing environments, especially at higher temperatures. Nanostructures of plasmonic ceramics are expected to be more susceptible to oxidation at the operation temperatures of heat-assisted magnetic recording (or thermally-assisted recording) due to larger surface to volume ratios and due to a larger ratio of the volume of the oxidizing layer to the working volume (see, e.g., G. N. Komratov, "The oxidation kinetics of titanium carbide, nitride, and carbonitride powders in air," Powder Metallurgy and Metal Ceramics 36, 510-514 (1997)), as the overall dimensions of NFTs are at nanometer scale. The advantage of plasmonic ceramics is that they may be conveniently grown with other ceramics that are capable of protecting against oxidation when applied to the design as a coating, or capping, layer. These materials also exhibit thermal effects (e.g., expansion, conduction, etc.) similar to the plasmonic ceramic material component and reduce the problems arising from mechanical stress due to rapid thermal loading and cycles. In some embodiments, lattice matched layers are also grown, which increase the protection against mechanical and thermal stress. In other embodiments, the surface of a given plasmonic ceramic material may be modified such that oxidation threshold temperatures are greater than device operating temperatures. One such example is a thin titanium carbonitride layer surrounding a titanium nitride plasmonic antenna. Other examples include but are not limited to AlN, (Al,Sc)N, SiN, etc. FIG. 8 illustrates an example of a plasmonic ceramic antenna B capped with a protective layer C against oxidation. The design of the present invention may be modified such that basic operation principles are not violated. The thickness of the protective layer may be between 0.1 and 25 nm for efficient protection of the antenna and operation of the magnetic recording device.

Another way to prevent oxidation of a plasmonic antenna is to locate the head, or a part of the head containing the antenna structure, in an inert gas environment.

Refractory plasmonic materials provide greater durability at higher temperatures compared to plasmonic noble metals. Taking advantage of refractory materials, the operating mechanism of the device can be changed to heat focusing instead of light confinement. In such embodiments of the present invention, a heated plasmonic antenna is used as a nanometer scale heat source to directly heat the magnetic layer using both radiative and conductive heat transfer. This operation eliminates the need for light scattering away from the particle and electromagnetic focusing at the magnetic layer. Thus, near field limitations due to the exponential decay of the electromagnetic field are avoided. It is also possible to make use of these three mechanisms together in order to achieve more efficient heating and more flexible designs. For example, the antenna may be designed such that the heat transfer mechanisms contribute to heating of the magnetic layer, thus eliminating the need for high local field intensities. Consequently, lower excitation intensities may be used and thermal load on the nanostructure is reduced.

Annealing nanostructures of Au, Ag, Cu, or Al (or non-stoichiometric binary or ternary compounds) at temperatures above 100 degrees Celsius also improves the power-handling capacity of the NFT. The higher power-handling capacity comes from the higher temperature of heating and is crucial for HAMR technology.

Additionally, coating the plasmonic material with a thin layer or layers (<25 nm) of a dielectric material increases its thermal stability and allows for higher temperatures of heating.

Instead of metals such as Au, Ag, Al and Cu, the plasmonic material can be any of the non-stoichiometric or stoichiometric ceramics compounds listed in this application (e.g., $TiN_x$, $ZrN_x$, $HfN_x$, $TaN_x$, $VN_x$, $TiSi_{2-x}$, $TiAl_xN_y$, $TiZr_xN_y$, $ZnO$, $SnO_2$, $In_2O_3$, $RuO_2$, $Lu_2O_3$, $WO_2$, $MgB_2$). These plasmonic materials provide much higher thermal stability and wear resistance than standard metals such as Au, Ag, Al, and Cu.

In particular, titanium nitride as the plasmonic material provides better local heating than Au, Ag, Al, or Cu. Titanium nitride grown by sputtering, pulsed laser deposition, atomic layer deposition or chemical vapor deposition at elevated temperatures (>500 degrees Celsius) can, for the reasons described herein, provide optical properties that favor plasmonic local heating applications. It is also possible to grow TiN at lower deposition temperatures with comparable optical performance.

Additionally, while gold and silver do not have optical properties that can be tailored, adjusted, or tuned to suit a particular application, ceramic compounds do have the ability to be tailored, adjusted, and tuned to the particular coupled medium. This adjustable aspect allows for achievement of very high area densities (i.e. the light source, nanoparticle, and medium can all be tuned in order to achieve optimal performance characteristics).

It will be understood by those skilled in the art that various changes in form and details may be made therein without departing from the spirit and scope of the invention as set forth in the appended claims. Those skilled in the art will recognize, or be able to ascertain using no more than routine experimentation, many equivalents to the specific embodiments of the invention described herein. Such equivalents are intended to be encompassed in the scope of the claims.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. An apparatus, comprising: a near field transducer (NFT) for heat-assisted magnetic recording, a light source for heating said near field transducer by a radiation, wherein the NFT is comprised of one or more ceramic plasmonic materials containing essentially only plasmonic refractory transition metal nitrides and a capping layer, wherein a first portion of a total surface area of the NFT is only in contact with a waveguide and a second portion of the total surface area of the NFT which accounts for an entire surface area of the NFT when combined with said first portion is only in contact with the capping layer, wherein the capping layer is not part of the waveguide, and said second portion of the total surface area of the NFT is both substantially perpendicular and substantially parallel to an air-bearing surface (ABS).

2. The apparatus of claim 1, wherein the one or more ceramic plasmonic materials comprise nitrides of metals, including TiNx, ZrNx, HfNx, TaNx, VNx, TiAlxNy, TiZrxNy, where "x" and "y"' are at least one (1), and combinations thereof.

3. The apparatus of claim 1, wherein said ceramic plasmonic material is a refractory plasmonic material, said refractory plasmonic material acting as a heat source and as a field enhancer which directly heats a magnetic layer.

4. The apparatus of claim 1, wherein the plasmonic material of said near field transducer is further enclosed to operate in an inert gas environment.

5. The apparatus of claim 1, wherein said capping layer is an oxidation barrier.

6. The apparatus of claim 1, further comprising a ceramic plasmonic waveguide section between said light source and said ceramic plasmonic material.

7. The apparatus of claim 6, wherein said waveguide section is a tapered dielectric waveguide.

8. A method of heat-assisted magnetic recording, using a localized surface plasmon resonance (LSPR) for data storage, comprising: sending a beam of light through a waveguide into a near-field transducer (NFT), wherein said NFT contains a nanostructure endpoint made of a ceramic material, the ceramic material containing essentially only plasmonic refractory transition metal nitride and a layer of protective dielectric material over said ceramic plasmonic material, wherein a first portion of a total surface area of the NFT is only in contact with the waveguide and a second portion of the total surface area of the NFT which accounts for an entire surface area of the NFT when combined with said first portion is only in contact with the layer of protective dielectric material, wherein the layer of protective dielectric material is not part of the waveguide and said second portion of the total surface area of the NFT is both substantially perpendicular and substantially parallel to an air-bearing surface (ABS), creating a surface plasmon-enabled local heating in said nanostructure endpoint; and said heated endpoint of said NFT interfacing through the ABS to a recording disk, thus enabling magnetic recording.

9. The method of claim 8, wherein the one or more ceramic plasmonic materials comprise nitrides of metals TiNx, ZrNx, HfNx, TaNx, VNx, TiAlxNy, TiZrxNy, where "x" and "y"' are at least one (1), and combinations thereof.

10. The method of claim 8, wherein an operating mechanism of said local heating is a combination of all three parts: radiative heat focusing, nanoscale conductive heating, and light confinement.

11. The method of claim 1, wherein the capping layer has a thickness between 0.1 and 25 nm to prevent the oxidation of the nitride material.

12. The method of claim 1, wherein the capping layer exhibits thermal effects similar to the one or more ceramic plasmonic materials.

13. The method of claim 1, wherein the capping layer is titanium carbonitride layer.

14. The method of claim 1, wherein the capping layer is AlN or SiN.

15. The method of claim 1, wherein the capping layer is ScN.

16. The method of claim 1, wherein the capping layer is a dielectric binary compound.

\* \* \* \* \*